United States Patent [19]

Bone

[11] 4,023,414
[45] May 17, 1977

[54] ALTIMETERS

[75] Inventor: Arthur George Bone, Aldershot, England

[73] Assignee: The Secretary of State for Defence in Her Britannic Majesty's Government of the United Kingdom of Great Britain and Northern Ireland, London, England

[22] Filed: July 8, 1976

[21] Appl. No.: 703,662

[30] Foreign Application Priority Data

July 8, 1975 United Kingdom .............. 28776/75

[52] U.S. Cl. ........................... 73/387; 116/DIG. 43; 116/114 PV
[51] Int. Cl.² .......................................... G01L 7/12
[58] Field of Search ............. 116/DIG. 43, 114 PV; 73/384, 386, 387

[56] References Cited

UNITED STATES PATENTS 2,458,022  1/1949  Phelps et al. ........................ 73/387

*Primary Examiner*—Donald O. Woodiel
*Attorney, Agent, or Firm*—Cushman, Darby & Cushman

[57] ABSTRACT

An altimeter has a pointer which rotates clockwise once round a dial for each thousand unit (feet or meters) increase in altitude, the zero of the dial being in the nine o'clock position.

Two digital displays are situated one above and one below the horizontal through the dial zero. When the pointer lies in the upper segment of the dial a reading is shown on the upper display and when the pointer lies in the lower segment of the dial a reading is shown on the lower display. When the pointer is in the region of the zero position (for example within 100 feet of the zero position) a reading is shown on both displays. The upper display then reads thousands corresponding to a pointer position above zero and the lower display reads thousands corresponding to a pointer position below zero (whether the pointer is above or below zero).

8 Claims, 10 Drawing Figures

ALTIMETERS

The present invention relates to pressure sensitive altimeters for aircraft, and is particularly concerned with altimeter displays.

Pressure sensitive altimeters are well known and have been used in aircraft almost since the first days of aviation. Until comparatively recently the altitude was displayed by three pointers of graduated lengths rotating in front of a calibrated circular dial. A complete revolution of each pointer represented respectively 1, 10 or 100 thousand feet, the longest pointer being used to indicate the 1000 feet revolutions. The increasing complexity in aircraft instrumentation systems and the increasing performances of aircraft, especially since the introduction of turbojet powered aircraft, greatly increased the inherent danger of misreading the altimeter. Several accidents have occurred because pilots flying under instrument flight conditions and having to concentrate on a plurality of instruments misread the altimeter by 1000 or even by 10,000 feet. In consequence an altimeter, known as the counter-pointer altimeter, was developed and this type of altimeter is currently used in most high performance aircraft. In the counter-pointer altimeter the display includes a single pointer which rotates against a dial, one revolution of the pointer defining a change in altitude of 1000 ft, and a digital counter set on the face of the dial indicates thousands and hundreds, and on some instruments fifties or twenties, of feet.

Altimeters have usually been mechanically operated by variations in the dimensions of an aneroid capsule subjected to the ambient pressure surrounding an aircraft. Some altimeters, however, are operated by electrical actuators, signals to the actuators being generated again by changes in the dimensions of an aneroid capsule. As a result of the increasing use of computers in aircraft systems, altimeters have recently been developed using vibrating pressure transducers and computers to generate a display of altitude. The basic display of the counter-pointer altimeter is, however, basically the same whether it is generated by mechanical, electrical or computer means.

In all altimeters there is provision for adjusting the scale according to changes of pressure of the type occasioned by changes in meteorological conditions. A digital display of the pressure to which the instrument is adjusted is usually displayed on the dial.

It is conventional for the zero position of the dial to be at the top, commonly referred to as the 12 o'clock position and for the pointer or pointers to rotate clockwise for increasing altitude. It has been found that with this format, and with a single digital counter, there is still some danger of ambiguity which is liable to cause misreading of the altimeter by a thousand feet at the point where the counter is about to change the readings of the digits indicating thousands.

According to the present invention is a pressure sensitive altimeter of the type having a display with a pointer which rotates through one revolution round a dial for each one thousand unit increment of altitude and rotates clockwise for increasing altitude and a digital counter displaying altitude in thousands and hundreds of units, the dial has its zero at the nine o'clock position and the digital counter has two displays, a first display situated above and a second display situated below an axis of symmetry of the dial which passes horizontally through the zero, the first display being operative, considering clockwise movement of the pointer, only from a pointer position at a predetermined distance before the zero position to a pointer position at least half a revolution from the zero position, the initial display reading being the nearest adjacent thousands of units, and the second display being operative, considering clockwise movement of the pointer, only from a pointer position at most half a revolution from the zero position to a pointer position a predetermined distance past the zero position, the final display reading including the thousands and last hundred units before the pointer passes the zero position.

The units will usually be feet but may in some cases be meters.

The altimeter may be responsive to variations in the dimensions of an aneroid capsule communicated either mechanically or electrically, or may be responsive to a computer input controlled according to the frequency of vibration of a vibrating transducer subject to ambient air pressure. The display may also be responsive to a computer input controlled by changes in the dimensions of an aneroid capsule. A preferred embodiment of the invention is computer controlled and has an hexagonally shaped dial and a pointer simulated by the operation of solid state display devices, such as light emitting diodes, positioned round the periphery of the dial.

Some embodiments of the invention will now be described, by way of example only, with reference to the accompanying drawings, of which:

Figure 3:
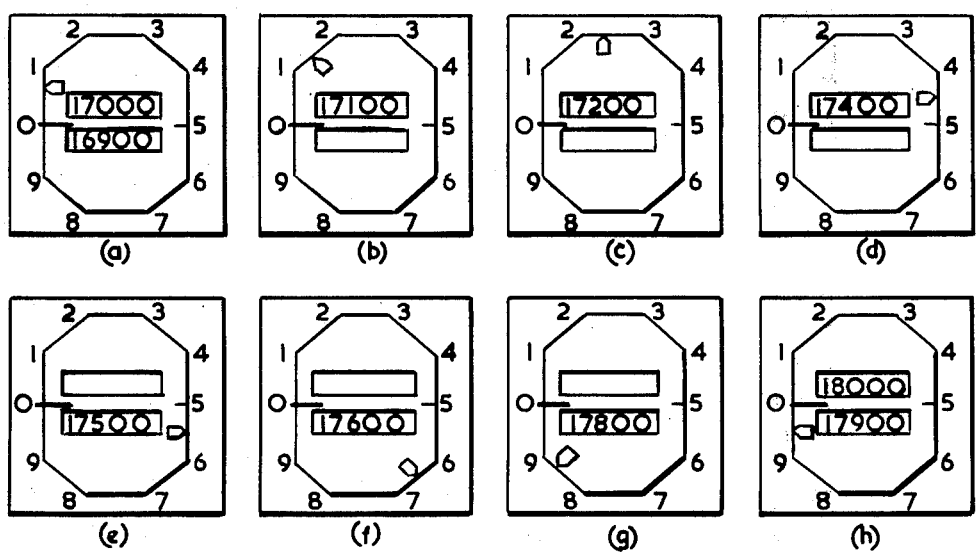

FIGS. 3 (a) to 3 (h) show sequentially the altimeter readings corresponding to an increase in altitude of 1000 feet.

An altimeter 10 (FIG. 1) is driven by driving means 11 responsive to a pressure sensitive device 12 which is connected by a tube 13 to an aircraft static (ambient pressure) supply (not shown). The altimeter 10 has a display including a pointer 14 which rotates around a dial 15 marked in increments of 100 feet, the zero position being as shown at the nine o'clock position. Also on the dial 15 are two digital counters 16 and 17, a digital read out 18 of pressure setting, and a barometric pressure setting knob 19. The drive means 11 is so adjusted that when the pointer 14 lies in a range from a predetermined point above the zero position to adjacent the 500 foot mark the digital counter 17 has no reading. Similarly, when the pointer 14 lies in a region from adjacent the 500 foot mark to a predetermined point below the zero position there is no reading on the digital counter 16.

As a result of this arrangement, when the pointer 14 lies between the predetermined points (that is, when it is in the region of the zero position) the digital display 16 is arranged to read to the nearest 1000 feet and the digital display 17 is arranged to read a value equal to that on display 16 minus half the altitude difference between the predetermined points. The predetermined points will normally be 100 feet above and 100 feet below the zero point respectively. With this arrangement when the pointer 14 is in the region of the zero position there can be no confusion as to which is the nearest thousands of feet. This will be better understood by reference to the preferred embodiment of the invention as illustrated in FIGS. 2 and 3.

Figure 1:
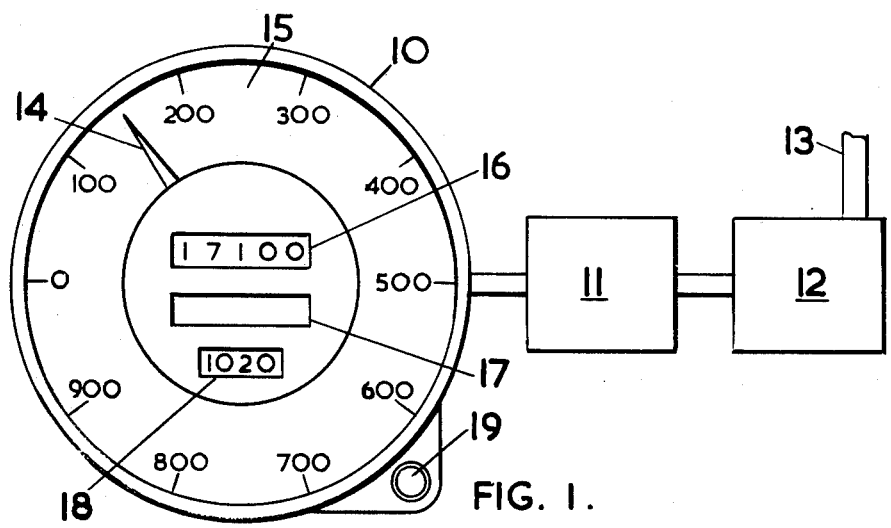
FIG. 1 shows a simple form of altimeter.
Figure 2:
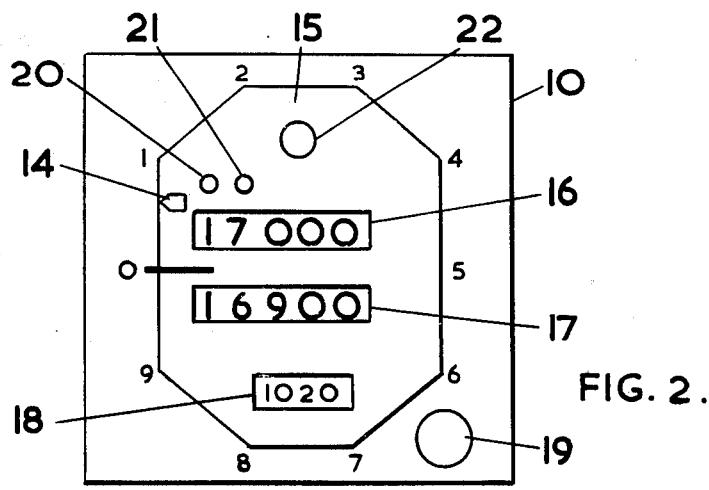
FIG. 2 shows the display of a preferred form of altimeter.

FIG. 2 illustrates a computer operated altimeter display which displays the same information as that displayed on the altimeter illustrated in FIG. 1, the same reference numbers being allotted to FIG. 2 as to FIG. 1. The dial 15 of this embodiment is octagonal, and the pointer 14 consists of a plurality of light emitting diodes symmetrically disposed around the dial 15.

With computer operation, apart from the information given on the altimeter illustrated in FIG. 1, which are shown on FIG. 2 with the same references as in FIG. 1, other information can conveniently be displayed. Such information might, for example, be in the form of warning lights such as those indicated at 20 and 21 to give an indication of altitudes greater than 10,000 feet or less than 1000 feet respectively, or as shown at 22 which can be selected by means of, for example, a knob (not shown) to give a warning of any altitude as desired by an aircraft crew member.

As shown in FIG. 2 the altimeter is indicating a height of 17,050 feet, with the digital display 16 reading 17,000 and the digital display 17 reading 16,900. Should the height of an aircraft in which the altimeter is installed vary so that the height indicated drops to, for example, 16,950 feet the digital display 16 will still read 17,000 feet. This contrasts with conventional counter pointer displays, in which the zero position is at the 12 o'clock position and there is only one digital display, and in which variation of the above mentioned nature results in the digital display reading 16,900 feet. When a pilot of a modern aircraft is flying under instrument flight conditions in adverse circumstances such as in turbulence or when approaching to land he has to monitor many instruments, and can in consequence give only brief attention to each individual instrument. It is therefore possible for him, when glancing at a conventional altimeter, to note the 16 referring to the thousands of feet, misjudge the side of the zero point to which the pointer 14 is lying and so be 1000 feet out in his estimate of his altitude. This state of affairs is particularly dangerous during an approach to land and indeed it is believed that just such mistakes have led to several serious accidents.

The sequence of events as the aircraft climbs from 17,000 to 18,000 feet is shown in FIGS. 3(a) to 3(h). As the aircraft climbs through 17,500 feet the reading on digital display 16 disappears and that on display 17 appears.

It will be realised that the type of display used in this invention also has beneficial effects in enabling a pilot to maintain a constant altitude. In cruising flight aircraft commonly maintain a constant altitude at, or as nearly possibly at, a constant thousand feet mark. Variations from this constant height usually appear as a movement of the altimeter needle before the pilot's vertical speed indicator gives any indication of deviation from the desired level flight condition. Positioning of the zero at the nine o'clock position will enable the pilot to quickly note movement of the needle 14 and will give a direct indication to him of the control movements he should make to correct the deviation. This indication is particularly useful with the octagonal dial 15 of the embodiment as described with reference to FIG. 2.

With a computer controlled display, as described with reference to FIG. 2, a further simplificaton to the altimeter can be introduced by arranging a facility on the pressure setting knob 19 such that by, for example, pressing the knob the standard pressure setting is fed into the instrument. This standard setting (1013.25 millibars) is the setting used by all aircraft flying outside controlled air space.

It will be realised that the design and construction of mechanical and electrical parts of altimeters are so well known in the art that amplification of the description given above is unnecessary. Similarly as computers are now commonly used in aircraft and have previously been adapted for controlling altimeters it is unnecessary to describe in detail the application of a computer in this invention. It will likewise be realised that whilst the above description refers to altimeters calibrated in feet, the application of the invention to altimeters calibrated in meters is straightforward.

What I claim is

1. A pressure sensitive altimeter having a display comprising:

a pointer which rotates through one revolution round a dial for each one thousand unit increment of altitude, rotation of said pointer being clockwise for increasing altitude, said dial having its zero at the nine o'clock position;

a first digital display situated above an axis of symmetry of the dial which passes horizontally through the zero, said first display being operative, considering clockwise movement of said pointer, only from a pointer position a predetermined distance before the zero position to a pointer position at least half a revolution from the zero position, the initial reading being the nearest thousands of units; and a second digital display situated below said axis, said second display being operative, considering clockwise movement of said pointer, only from a position at most half a revolution from the zero position to a pointer position a predetermined distance past the zero position, the final reading on said second display comprising the thousands and last hundred units before said pointer passes the zero position.

2. A pressure sensitive altimeter as claimed in claim 1 wherein said dial is hexagonally shaped.

3. A pressure sensitive altimeter as claimed in claim 1 wherein said display is computer controlled.

4. A pressure sensitive altimeter as claimed in claim 3 wherein said pointer is simulated by the operation of solid state display devices.

5. A pressure sensitive altimeter as claimed in claim 4 wherein said solid state display devices are light emitting diodes.

6. A pressure sensitive altimeter as claimed in claim 2 wherein said display is computer controlled.

7. A pressure sensitive altimeter as claimed in claim 6 wherein said pointer is simulated by the operation of solid state display devices.

8. A pressure sensitive altimeter as claimed in claim 7 wherein said solid state display devices are light emitting diodes.

* * * * *